US006843426B2

United States Patent
Isaacson

(10) Patent No.: US 6,843,426 B2
(45) Date of Patent: Jan. 18, 2005

(54) AUTOMOBILE RADIANT HEATING APPARATUS

(76) Inventor: Justin E. Isaacson, 22768 240th St., Nevis, MN (US) 56467

( * ) Notice: Subject to any disclaimer, the term of this patent is extended or adjusted under 35 U.S.C. 154(b) by 0 days.

(21) Appl. No.: 10/405,021

(22) Filed: Apr. 1, 2003

(65) Prior Publication Data

US 2004/0195344 A1 Oct. 7, 2004

(51) Int. Cl.[7] .............................................. B60H 1/00
(52) U.S. Cl. ........................ 237/12.3 B; 165/41; 165/42
(58) Field of Search ....................... 237/12.3 R, 12.3 B, 237/69, 70; 165/41, 42

(56) References Cited

U.S. PATENT DOCUMENTS

| 4,653,729 A | * | 3/1987 | Ando ..................... 237/12.3 B |
| 4,700,046 A | | 10/1987 | Fristedt ....................... 219/202 |
| 4,926,025 A | | 5/1990 | Wilhelm ..................... 219/202 |
| 4,964,674 A | | 10/1990 | Altmann et al. ............. 297/180 |
| 5,002,335 A | | 3/1991 | Bengtsson ................... 297/180 |
| 5,002,336 A | | 3/1991 | Feher ......................... 297/180 |
| 5,111,025 A | | 5/1992 | Barma et al. ................ 219/217 |
| 5,117,638 A | * | 6/1992 | Feher ........................... 62/3.2 |
| 5,405,186 A | | 4/1995 | Hanson et al. ............ 297/180.1 |
| 5,542,603 A | * | 8/1996 | Macduff ........................ 237/69 |
| 6,073,998 A | | 6/2000 | Siarkowski et al. ...... 297/180.12 |
| 6,093,910 A | | 7/2000 | McClintock et al. ........ 219/217 |
| 6,150,642 A | | 11/2000 | Weiss et al. ................. 219/528 |
| 6,164,719 A | | 12/2000 | Rauh ...................... 297/180.12 |
| 6,325,297 B1 | * | 12/2001 | Calvin et al. ........... 237/12.3 B |
| 6,389,772 B2 | * | 5/2002 | Gleckman et al. ......... 52/582.1 |

* cited by examiner

Primary Examiner—Derek S. Boles
(74) Attorney, Agent, or Firm—Nawrocki, Rooney & Sivertson, P.A.

(57) ABSTRACT

The present invention provides a heating apparatus for providing radiant heat to a passenger compartment of a vehicle. Heated fluid is transported from a heat source positioned outside of the passenger compartment. A supply manifold selectively dispenses heated fluid into a plurality of tubular members extending into the passenger compartment. The heated fluid provides radiant heat for heating the passenger compartment. The fluid is transported within the tubular members to a return manifold, wherein said fluid is recycled to the heat source.

20 Claims, 3 Drawing Sheets

Heated Automotive Seat

AUTOMOBILE RADIANT HEATING APPARATUS

BACKGROUND OF THE INVENTION

1. Field of the Invention

The present invention relates generally to the field of heating apparatus, and more particularly to the field of heating apparatus for use in vehicle.

2. Background of the Prior Art

The prior art teaches transportation vehicles equipped with a heating system that includes a fan that blows heated air through a series of vents. The heated air enters the passenger compartment through the vent, warming the passenger compartment by convection. A problem with convective heat is that it can be uncomfortable to a passenger, such as when the heated air is blown directly at a passenger.

The prior art also teaches the use of electric seat warmers. Heat is supplied to the seat in the form of an electric current, to heat the seat. A problem with seat warmers is that the passenger must be sitting directly on the heated seat in order to benefit from the heat supply. The seat warmer does not provide sufficient heat to control the temperature of the entire passenger compartment.

It would be advantageous to provide a heating system for an automobile that provides the comfort of non-convective heat, and has the ability to heat the entire passenger compartment.

SUMMARY OF THE INVENTION

The present invention provides a heating apparatus for heating a passenger compartment of a vehicle using radiant heat. A supply manifold is able to selectively supply a heated fluid to a first end of at least a single tubular member. The tubular member extends into the passenger compartment. As the heated fluid flows through the tubular member, the tubular member provides radiant heat to the passenger compartment. The tubular member has a second end that is connected to a return manifold. The return manifold allows the fluid to exit the passenger compartment and return to the heat source for reheating.

The fluid is transferred through the use of a pump. The fluid may be heated from the heat of the engine of the vehicle or by a separate heat source, such as an auxiliary boiler.

The present invention provides a plurality of tubular members for extending through and heating an entire passenger compartment. This provides an advantage over the prior art in that an entire passenger compartment is heated using the more comfortable radiant heat. Further, the present invention uses conditioned fluid that is heated from a heat source positioned external to the passenger compartment. This removes the need to have a conditioning device positioned beneath the seat, freeing up space in the passenger compartment.

BRIEF DESCRIPTION OF THE DRAWING FIGURES

DETAILED DESCRIPTION OF THE PREFERRED EMBODIMENTS

Figure 1:
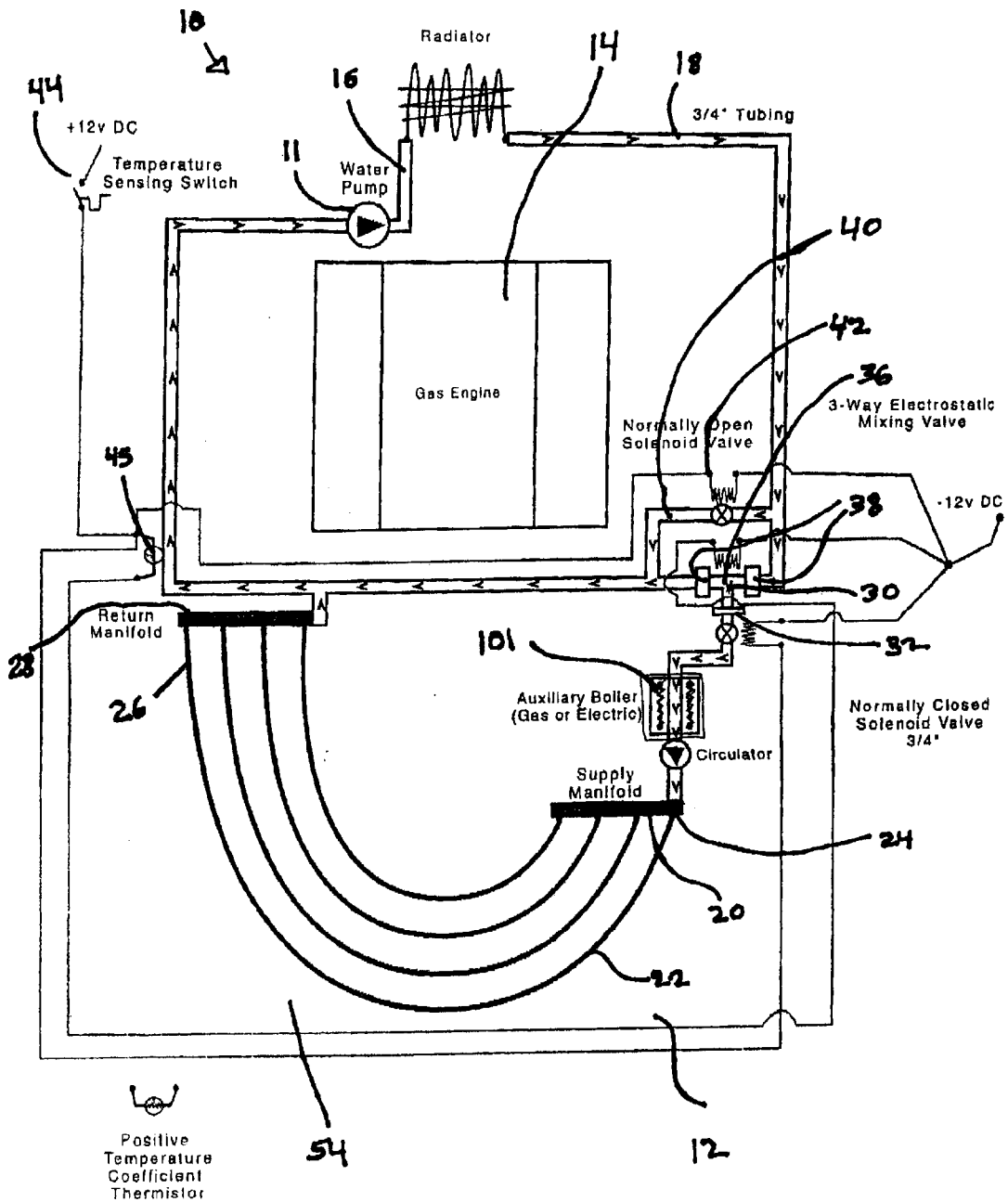
FIG. 1 Illustrates a first embodiment of a radiant heating apparatus.

FIG. 1 shows a first embodiment of an automobile radiant heating apparatus 10 for providing radiant heat to a passenger compartment 12 of a vehicle. A heat source 14 is used to heat a fluid 18 that is being pumped through a hose 16. The heated fluid 18 is selectively transported to a supply manifold 20 for dispensing the heated fluid 18 to the passenger compartment 12. The supply manifold 20 is connected to and in fluid communication with a first end 24 of at least a single tubular member 22 extending into the passenger compartment 12 of the vehicle. As the heated fluid 18 is dispensed into the tubular member 22, the fluid 18 provides radiant heat to the passenger compartment 12 of the vehicle.

A second end 26 of each tubular member 22 is connected to and in fluid communication with a return manifold 28 for removing the heated fluid 18 from the passenger compartment 12 and returning the fluid 18 to the heat source 14 positioned external to the passenger compartment 12. The fluid 18 is delivered to the heat source 14 by the hose 16. Then, the fluid 18 is reheated by the heat source 14 and selectively transported to the supply manifold 20.

In this first embodiment of the present invention, heated fluid 18 is selectively transported to the supply manifold 20 by a 3-way mixing valve 30. The supply manifold 20 is connected to and in fluid communication with a first connection port 32 of the 3-way mixing valve 30. A first valve 34 is positioned within the first connection port 32 of the 3-way mixing valve 30, for selectively allowing fluid 18 to flow into the supply manifold 20. The first valve 34 is a normally closed valve, such as a normally closed solenoid valve. The heated fluid 18 is selectively prevented from entering the supply manifold 20 until the first valve 34 is actuated to an open position.

When the first valve 34 is closed, the heated fluid 18 is able to flow through a straight portion 36 of the 3-way mixing valve 30 and be recycled through the hose 16. The straight portion 36 of the 3-way mixing valve 30 has two through-ports 38, that allow the heated fluid 18 to flow through the 3-way mixing valve 30 when the first valve 34 is in a closed position.

A bypass loop 40 is positioned in combination with the 3-way mixing valve 30. The bypass loop 40 has a second valve 42. The second valve 42 is a normally open valve, such as a normally open solenoid valve, for allowing fluid 18 to flow through the bypass loop 40 unless actuated to a closed position.

The operation of the 3-way mixing valve 30 can be controlled manually or controlled automatically by a thermistor 45. When the 3-way mixing valve 30 is operated manually, the thermistor 45 is not used. When the 3-way mixing valve 30 is operated automatically, the thermistor 45 controls the amount of electricity going to the 3-way valve 30 to compensate flow rates for achieving a predetermined fluid temperature. The thermistor 45 may be a positive temperature coefficient thermistor placed in series with the thermostat 44. The thermistor 45 should have a temperature sensing range of 35 degrees Fahrenheit, and in that sensing range, have a corresponding fluctuation resistance to electromotive force going from zero resistance, or continuity, at a lowest temperature, to total resistance to electromotive force at the top temperature in the range.

In operating the apparatus automatically, a thermostat 44 is set to a predetermined temperature. The thermostat 44 senses the temperature of the passenger compartment 12. In order to heat the passenger compartment 12 to the predetermined temperature, the thermostat 44 actuates the first valve 34 to an open position, allowing heated fluid 18 to enter the supply manifold 20. The heated fluid 18 is dispensed into the tubular members 22 extending into the passenger compartment 12, for radiantly heating the passenger compartment 12.

The thermostat 44 may, alternatively, close the first valve 34 upon reaching and/or exceeding the predetermined temperature, and open the second valve 42, preventing heated fluid 18 from entering the passenger compartment 12 once the predetermined temperature has been achieved.

Figure 2:
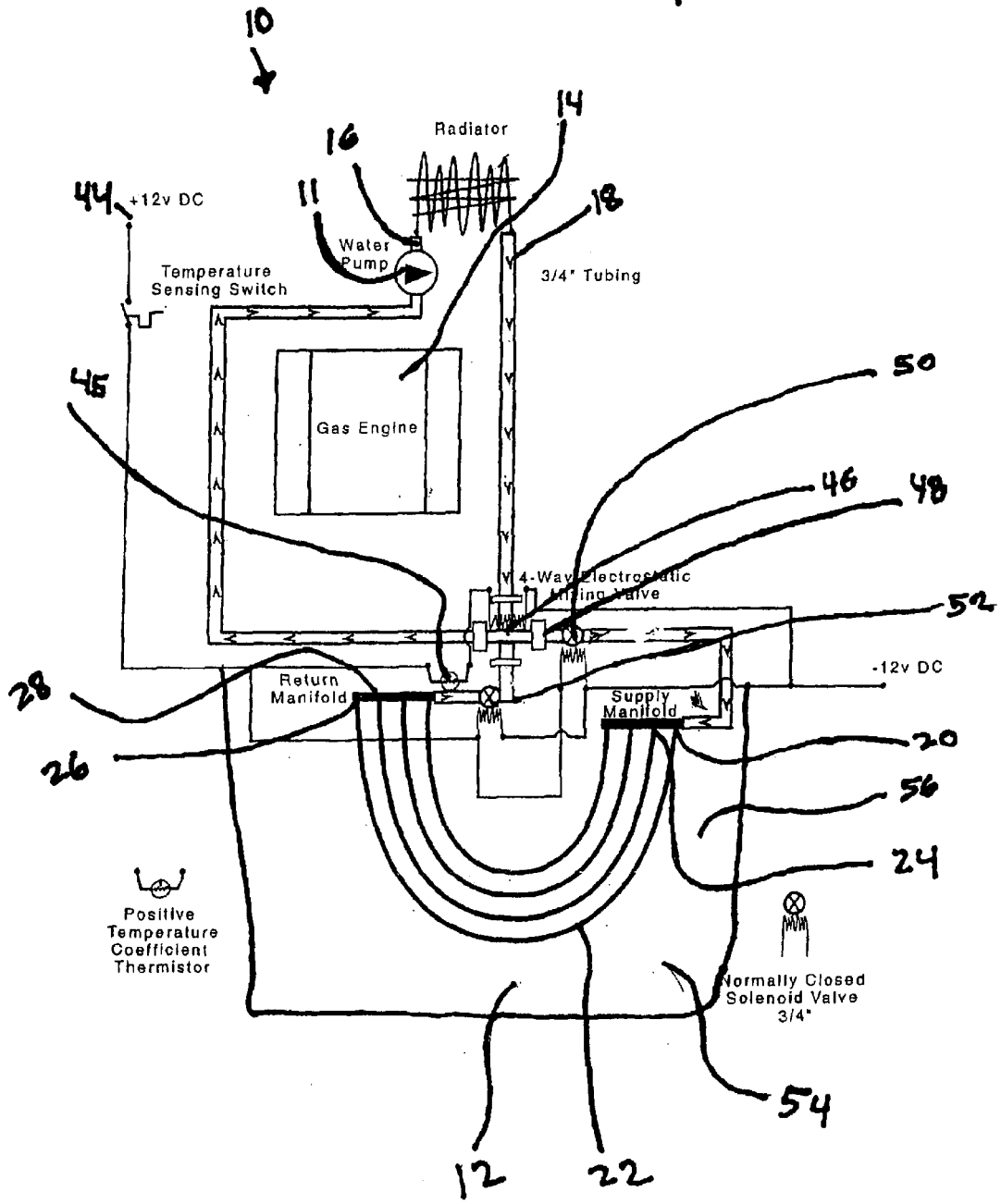
FIG. 2 Illustrates a second embodiment of a radiant heating apparatus.

FIG. 2 illustrates another embodiment of the present invention. In this embodiment, a fluid 18 is first heated as it is pumped through a hose 16. The fluid 18 is then selectively dispensed into the passenger compartment 12 of the vehicle by a 4-way mixing valve 46, into the supply manifold 20.

The 4-way mixing valve 46 allows, for example, for a vehicle with a higher operating temperature to achieve the same temperature in the passenger compartment as a vehicle with a lower operating temperature by regulating the temperature of the fluid as it enters the supply manifold, as will be discussed herein.

The 4-way mixing valve 46 has a first port 48 for dispensing heated fluid 18 to the supply manifold 20. The first port 48 has a first valve 50 that is in a normally closed position, such as a normally closed solenoid valve. A second valve 52 allows fluid from the return manifold 28 to enter the 4-way mixing valve 46. The second valve 52 is a normally closed valve. The 4-way mixing valve 46 allows heated fluid 18 to be selectively mixed with fluid 18 from the return manifold 28 prior to entering the supply manifold 20. In such instance, the first valve 50 and second valve 52 are in the open position. Alternatively, the second valve 52 may be closed such that only heated fluid 18 is allowed to enter the supply manifold 20. When the passenger compartment 12 has reached the predetermined temperature, the first valve 50 and second valve 52 are closed and the fluid 18 is able to cycle through the hose 16.

The operation of the 4-way mixing valve 46 can be controlled manually or controlled automatically by a thermistor 45. When the 4-way mixing valve 46 is operated manually, the thermistor 45 is not used. When the 4-way mixing valve 46 is operated automatically, the thermistor 45 controls the amount of electricity going to the 4-way valve 46 to compensate flow rates in order to achieve a predetermined fluid temperature upon returning the fluid 18 to the hose 16. The thermistor 45 may be a positive temperature thermistor placed in series with the thermostat 44.

In operation, a thermostat 44 is set to a predetermined temperature. In a heating mode, the thermostat 44 may actuate the first valve 50, allowing heated fluid to enter the supply manifold 20. The second valve 52 is also opened by the thermostat 44 in order to allow fluid 18 from the return manifold 28 to mix with fluid 18 entering the supply manifold 20 within the 4-way mixing valve 46. This allows the temperature of the incoming heated fluid 18 to be controlled by the thermistor 45, as opposed to merely being controlled by the heat source 14.

The present invention may also incorporate a reflective material 54 to be layered on the flooring 54 and/or walls of the passenger compartment 12, beneath the tubular members 22. Such reflective material 54 can cover all or a portion of the flooring 56, for example, such that the tubular members 22 are secured over the reflective material 54 for reflecting radiant heat into the plenum defined by the passenger compartment 12.

It is further contemplated that a fabric covering 57 may be placed over the tubular members 22 and reflective layer 54, such as for providing aesthetic appearance to the passenger compartment and/or insulation.

Figure 3:
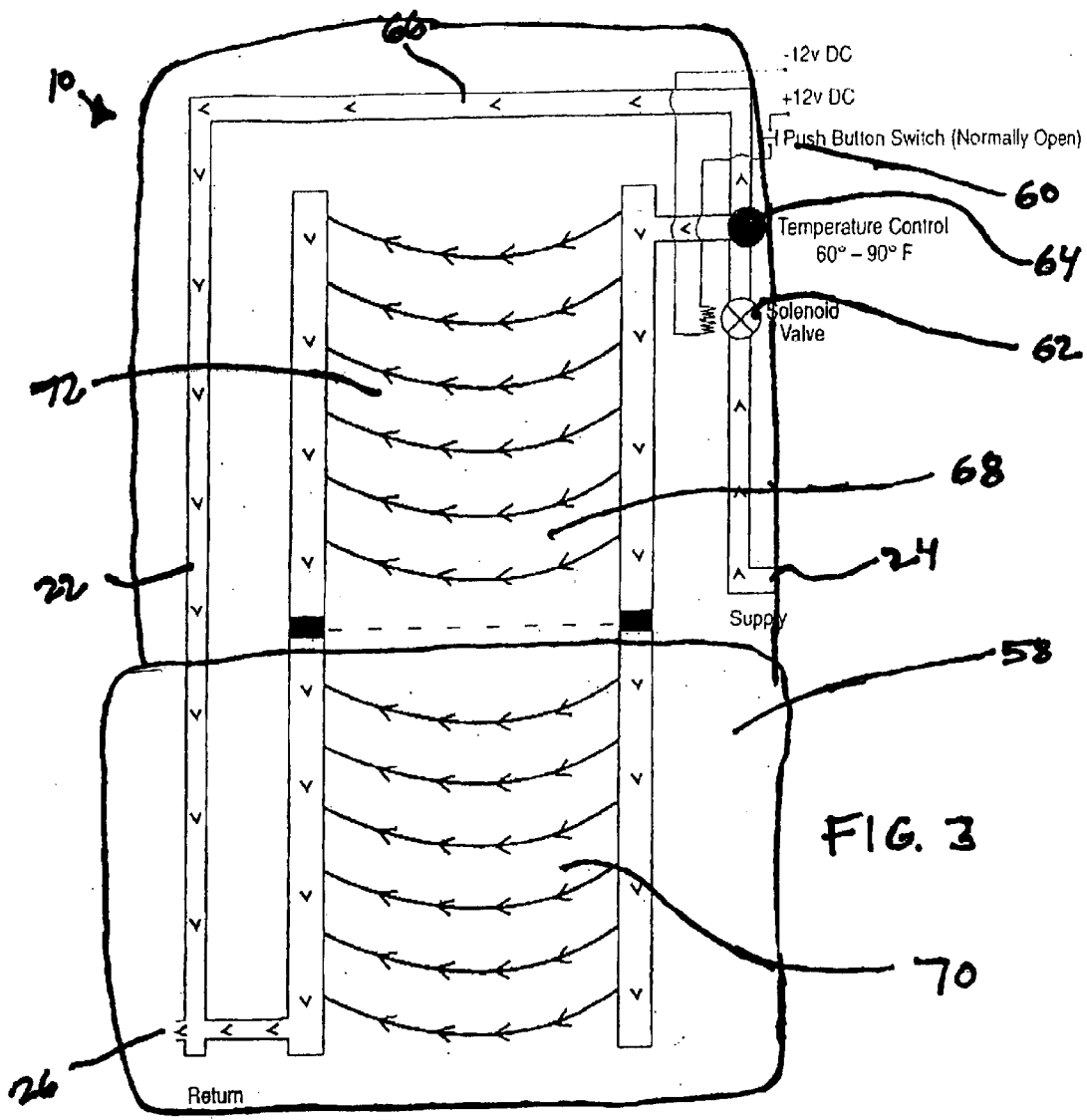
FIG. 3 Illustrates a third embodiment of a radiant heating apparatus.

FIG. 3 illustrates yet another embodiment of the present invention. In this embodiment, the supply manifold 20 supplies heated fluid 18 to the passenger compartment 12 of the vehicle through a plurality of tubular members 22 extending into a passenger seat 58 positioned within the passenger compartment 12. A push button switch 60 actuates a normally closed valve 62, such as a normally closed solenoid valve. A temperature control knob 64 allows a passenger to set a predetermined temperature for the seat 58. The heated fluid 18 is supplied to the plurality of tubular members 22 upon actuation of the push button switch 60. The tubular members 22 are configured in a perimeter loop 66 and a central grid 68 for providing radiant heat to the seat 58. The central grid 68 is defined by the space between two parallel tubular members 22 and a series of crossing tubular members 22.

The central grid 68 may extend along the sitting portion 70 of the seat 58 and/or the back rest portion 72 of the seat 58. Upon reaching the predetermined temperature set by the temperature control knob 64, the valve 62 is closed, either automatically by a thermostat 44 or manually, until the seat temperature falls below the predetermined temperature. The fluid 18 is returned to the heat source 14 through the return manifold 28.

In the above embodiments of the present invention, the heat source may be a vehicle engine, or a separate heating source such as an external boiler 101 configured and secured to a portion of the vehicle. The fluid may be coolant from the engine or any other suitable fluid, such as water or water mixtures. The hose carrying the fluid may be radiator tubing, and the fluid may be transported by a water pump, as commonly found on a vehicle.

It is contemplated that the present invention may be configured to work in conjunction with a blower heating system of a vehicle, including using the same thermostat. It is contemplated that the present invention may be installed in an existing vehicle or installed during the manufacturing of a new vehicle. The 3-way and 4-way valves may be electrostatic mixing valves. The mixing valves have electronically controlled zone valves for allowing and preventing flow from a predetermined port. It is contemplated that a series of supply and/or return manifolds may be incorporated for heating a single passenger compartment. Suitable tubular members used for radiantly heating the passenger compartment include polyethylene tubing, more specifically, cross-linked polyethylene tubing. The 3-way or 4-way mixing valve may be regulated by a positive temperature coefficient thermistor. A transformer or inverter may be connected to a power source, such as a battery of the vehicle, for providing electric power to the thermistor and valves and temperature sensing switches, or 12 volt direct current suitable devices may be used in the same fashion as a 24 volt alternating current device.

What is claimed is:

1. A heating apparatus for heating a passenger compartment of a vehicle, comprising:

a supply manifold for selectively supplying fluid heated by an external heat source into the passenger compartment;

a plurality of tubular members having a first end connected to and in fluid communication with said supply manifold, each of said plurality of tubular members extending into the passenger compartment of the vehicle for providing radiant heat to the passenger compartment by transporting the heated fluid into the passenger compartment;

a return manifold connected to and in fluid communication with a second end of said plurality of tubular members for removing the heated fluid from the passenger compartment.

2. The heating apparatus according to claim 1, wherein said heated fluid is supplied to said supply manifold by a radiator hose.

3. The heating apparatus according to claim 1, wherein said heated fluid is coolant fluid.

4. The heating apparatus according to claim 1, wherein said heated fluid is transported to said supply manifold by a water pump.

5. The heating apparatus according to claim 1, wherein said plurality of tubular members extend into a passenger seat.

6. The heating apparatus according to claim 1, wherein said plurality of tubular members extend on a floor of the vehicle.

7. The heating apparatus according to claim 6, wherein said plurality of tubular members are positioned over a reflective material positioned on the floor of the vehicle.

8. The heating apparatus according to claim 1, wherein said heated fluid is heated by a heat source.

9. The heating apparatus according to claim 8, wherein said heat source is an engine of the vehicle.

10. The heating apparatus according to claim 8, wherein said heat source is an auxiliary boiler.

11. The heating apparatus according to claim 1, wherein said heating apparatus includes a 3-way mixing valve with controllable operation for selectively supplying said heated fluid to said supply manifold.

12. The heating apparatus according to claim 1, wherein said heating apparatus includes a 4-way mixing valve with controllable operation for selectively supplying said heated fluid to said supply manifold.

13. A heating apparatus for heating a passenger compartment of a vehicle, comprising:

a supply manifold for selectively distributing fluid heated by an external heat source into the passenger compartment;

a plurality of tubular members having a first end connected to and in fluid communication with said supply manifold, each of said plurality of tubular members extending into the passenger compartment of the vehicle for providing radiant heat to the passenger compartment by transporting the heated fluid into the passenger compartment;

a return manifold connected to and in fluid communication with a second end of said plurality of tubular members for removing the heated fluid from the passenger compartment, a 4-way mixing valve for selectively supplying said heated fluid to said supply manifold, and a temperature sensor switch actuating said 4-way valve and external thereto for selectively supplying said heated fluid to said supply manifold.

14. A heating apparatus for heating a passenger compartment of a vehicle, comprising:

a supply manifold for selectively distributing heated fluid into the passenger compartment;

a plurality of tubular members having a first end connected to and in fluid communication with said supply manifold, each of said plurality of tubular members extending into the passenger compartment of the vehicle for providing radiant heat to the passenger compartment by transporting the heated fluid into the passenger compartment;

a return manifold connected to and in fluid communication with a second end of said plurality of tubular members for removing the heated fluid from the passenger compartment;

a valve for selectively supplying heated fluid to said supply manifold;

and a temperature sensor switch external to the valve for activating said valve for selectively supplying heated fluid to said supply manifold.

15. The apparatus of claim 14, wherein the valve is a 3-way mixing valve.

16. The apparatus of claim 15, wherein the temperature sensor switch is adjacent to the heated fluid removed by the return manifold.

17. The apparatus of claim 16, wherein the temperature sensor switch is a positive temperature coefficient thermistor.

18. The apparatus of claim 13, wherein the temperature sensor switch is a positive temperature coefficient thermistor.

19. A heating apparatus for heating a passenger compartment of a vehicle, comprising:

a supply manifold for selectively distributing fluid heated by an external heat source into the passenger compartment;

a plurality of tubular members having a first end connected to and in fluid communication with said supply manifold, each of said plurality of tubular members extending into the passenger compartment of the vehicle for providing radiant heat to the passenger compartment by transporting the heated fluid into the passenger compartment;

a return manifold connected to and in fluid communication with a second end of said plurality of tubular members for removing the heated fluid from the passenger compartment, a 3-way mixing valve for selectively supplying said heated fluid to said supply manifold, and a temperature sensor switch actuating said 3-way valve and external thereto for selectively supplying said heated fluid to said supply manifold.

20. The apparatus of claim 19, wherein the temperature sensor switch is adjacent to the heated fluid removed by the return manifold.

* * * * *